(12) United States Patent
Mattes et al.

(10) Patent No.: US 7,377,590 B2
(45) Date of Patent: May 27, 2008

(54) SCHOOL BUS PASSENGER SEAT WITH ENERGY ABSORBING OCCUPANT RESTRAINT

(75) Inventors: Patrick J. Mattes, Yoder, IN (US); Erik K. Nelson, Woodburn, IN (US); Thomas R. Graham, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/061,568

(22) Filed: Feb. 17, 2005

(65) Prior Publication Data

US 2005/0189801 A1 Sep. 1, 2005

Related U.S. Application Data

(60) Provisional application No. 60/548,081, filed on Feb. 26, 2004.

(51) Int. Cl.
*A47C 31/00* (2006.01)

(52) U.S. Cl. ................. 297/483; 297/475; 297/474; 297/468; 280/806

(58) Field of Classification Search ........... 297/483, 297/484, 475, 474, 476, 479, 468; 280/801.1, 280/806, 808
See application file for complete search history.

(56) References Cited

U.S. PATENT DOCUMENTS

| 4,372,012 A * | 2/1983 | Fohl ........................ 24/68 R |
| 4,784,352 A | 11/1988 | Smith et al. |
| 5,088,794 A * | 2/1992 | Iwami et al. ............... 297/483 |
| 5,350,195 A * | 9/1994 | Brown ...................... 280/806 |
| 5,851,055 A * | 12/1998 | Lewis ....................... 297/483 |
| 6,065,811 A * | 5/2000 | Weller ...................... 297/483 |
| 6,068,341 A * | 5/2000 | Rink ........................ 297/483 |
| 6,123,388 A | 9/2000 | Vits et al. |
| 6,485,098 B1 | 11/2002 | Vits et al. |
| 6,527,298 B2 * | 3/2003 | Kopetzky ................. 280/806 |
| 6,582,015 B2 * | 6/2003 | Jessup et al. .......... 297/216.17 |
| 6,715,792 B2 * | 4/2004 | Yamachi et al. ........ 280/801.2 |
| 6,732,969 B2 * | 5/2004 | Tanji et al. .............. 242/384.1 |
| 6,921,136 B2 * | 7/2005 | Bell et al. ................ 297/468 |
| 7,011,341 B2 * | 3/2006 | Herberg et al. ........... 280/807 |

* cited by examiner

*Primary Examiner*—David Dunn
*Assistant Examiner*—Erika Garrett
(74) *Attorney, Agent, or Firm*—Jeffrey P. Calfa; Gerald W. Askew

(57) ABSTRACT

A vehicle passenger seat active occupant restraint provides for absorbing energy from a passenger during sudden deceleration of a vehicle. The torso belt portion of a three-point restraint system is anchored using a spring and a displacement limiting linkage at the opposite end from its point of connection to the lap portion of the belt. During deceleration energy is transferred from the restrained occupant to the spring up to the displacement limit.

10 Claims, 5 Drawing Sheets

EXTENDED
POSITION
(ACTIVATED)

RETRACTED
POSITION
(STATIC)

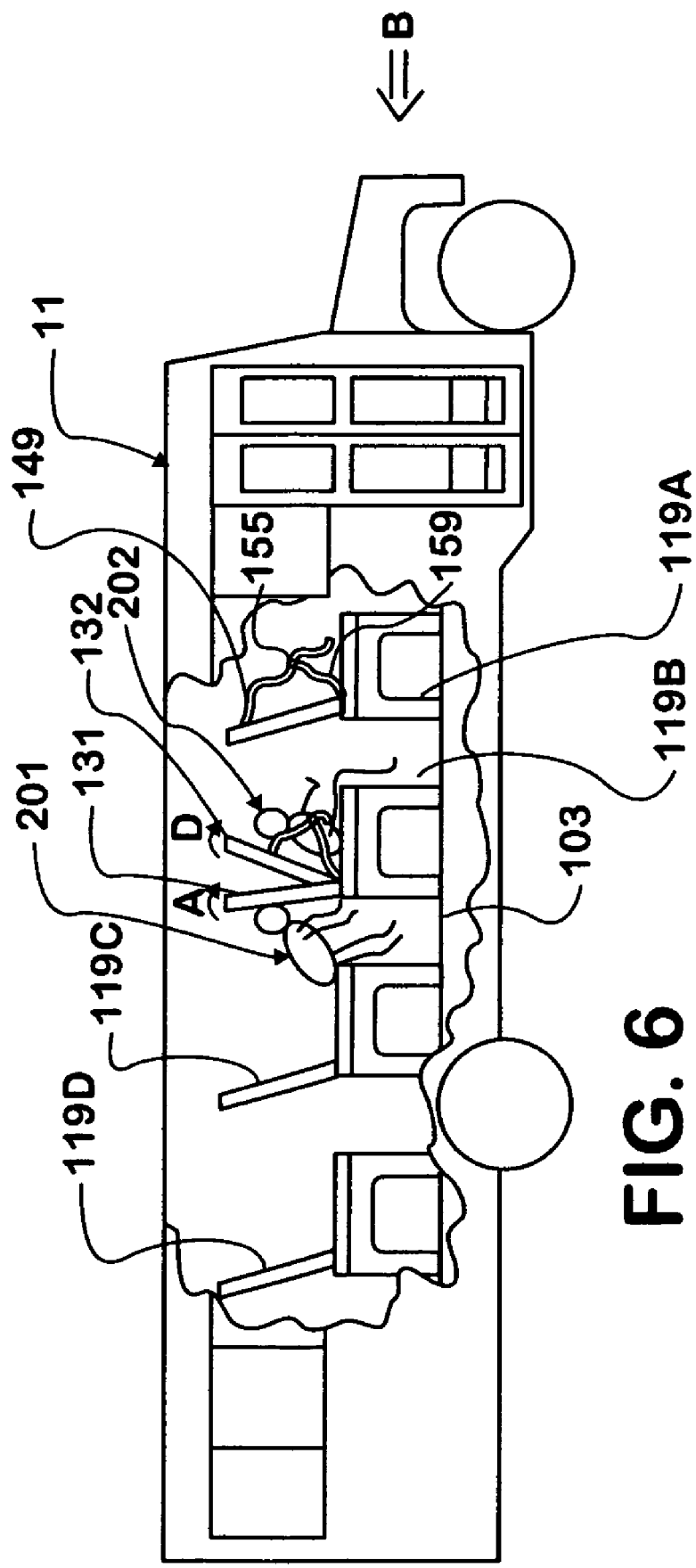

SCHOOL BUS PASSENGER SEAT WITH ENERGY ABSORBING OCCUPANT RESTRAINT

PRIORITY CLAIM

This application claims priority from provisional application Ser. No. 60/548,081 filed Feb. 26 2004.

BACKGROUND OF THE INVENTION

1. Technical Field

The invention relates to passenger seat occupant restraints and more particularly to an energy absorbing restraint.

2. Description of the Problem

Three point seat belt systems have long been used in automobiles. Three point seat belt systems combine a lap belt with a single upper torso belt crossing a person's chest from over one shoulder to a point of connection with the lap belt on the other side of the wearer's body, usually adjacent the location of a buckle located low on, or along side of, the seat.

Designers of school buses face certain difficulties in providing three point seat belts in buses. First, United States' federal regulations for passive restraints (i.e. those effective with respect to passengers whether wearing a seat belt or not) require that the rear side of a seat provide an impact barrier that bends or deforms upon impact by passengers sitting behind that seat. These requirements are codified at 49 CFR Sect. 571.222 (FMVSS 222).

The code specifies a passive restraint system for passengers, but does not require active restraints such as a two-point lap belt or three point lap/torso combination system. The passive restraint system requirements in effect provide that a compartment exist which contains an unbuckled passenger in the event of sudden deceleration. This has been met by making the back of the seat in front of a potentially unbuckled passenger into a deformable impact cushion. Although two point belt systems are offered on buses, designers need to consider three-point seat belts where requested by local or State governments, or by action groups. Although these belts are not required, when installed they too are subject to federal regulations. These requirements provide that the belts be installed in such a way as to limit a buckled passengers forward movement. The pertinent sections of the federal code are 49 CFR Sects. 571.209 and 210 (FMVSS 209 and FMVSS 210).

The conflict in requirements arises from the need to deal both with restrained and unrestrained passengers simultaneously. In a rapid deceleration event a passenger in a forward seat may be buckled in while a passenger in the seat immediately aft from the buckled in passenger may not be buckled in. With the aft passenger being spaced from the back of the forward seat, the initial response of the restraint systems occurs as a reaction to the buckled passenger moving forward in his seat and thereby applying tension on the buckled seat belt and at its attachment point to the seat frame. This can result in the belt pulling on the seat back in the forward direction and possibly reducing the strength of the seat back to meet a rear impact by the rear seat passenger. The reduction in seat back strength due to the pull on the three-point seat belt, which meets the FMVSS 210 requirement, may reduce the ability of the seat back to meet the FMVSS 222 requirements.

Recent school bus seat designs have been developed that involve a movable inner seat for the mounting of the three point seat belts and a separate seat back portion for the absorption of the impact of an unbuckled passenger. The movable inner seat was inserted into a recess within an outer, positionally fixed, but deformable, seat back. The outer seat back is then designed to deform in order to comply with FMVSS 222. Such a design is disclosed in U.S. Pat. Nos. 6,123,388, and 6,485,098. The concept of a seat inserted within a seat was also disclosed in U.S. Pat. No. 4,784,352 for an aircraft ejection seat.

SUMMARY OF THE INVENTION

The invention provides for shifting the seat loading sequences. This is accomplished by making a bus seat that has one seat back designed to provide the load absorption capacity dictated by FMVSS 222 and to provide a seat belt mechanism that delays the application of tension from the buckled seat belt passenger until the seat back can absorb any impact from an unbelted, rear seat passenger. The system then would satisfy the FMVSS 209 and 210 requirements for the buckled passenger. The FMVSS 209, 210 and 222 requirements are incorporated by reference into this document.

The invention provides a three-point seat belt system for a vehicle such as a school bus within a bus seat that has only one seat back and which meets the load absorption requirements of FMVSS 222. The system provides a seat belt mechanism that delays the tension from the buckled seat belt passenger until the seat back can absorb an impact load to assure satisfaction of the FMVSS 209 and 210 requirements for the buckled passenger. In the scenario where occupants are restrained in the seat, but occupants in the seat behind are not restrained in their seat, the portion of the seat intended to handle the restraint loads (FMVSS 210) must allow structure to remain in place to handle the FMVSS 222 requirement. A fixed displacement spring-mounted retractor mechanism for the torso portion of the seat belt, advantageously located within the seat back, allows the use of a single seat back design. The fixed displacement spring-mounted retractor allows for a pre-determined amount of restraint webbing movement before initiating full restraint. This allows occupants a set amount of forward travel immediately following a sudden deceleration event, leaving the seat back frame structure in place to absorb the impact loading of unrestrained occupants from the trailing seat.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 6 is a partial cutaway view of a school bus illustrating operation of the invention.

DETAILED DESCRIPTION OF THE INVENTION

Figure 1:
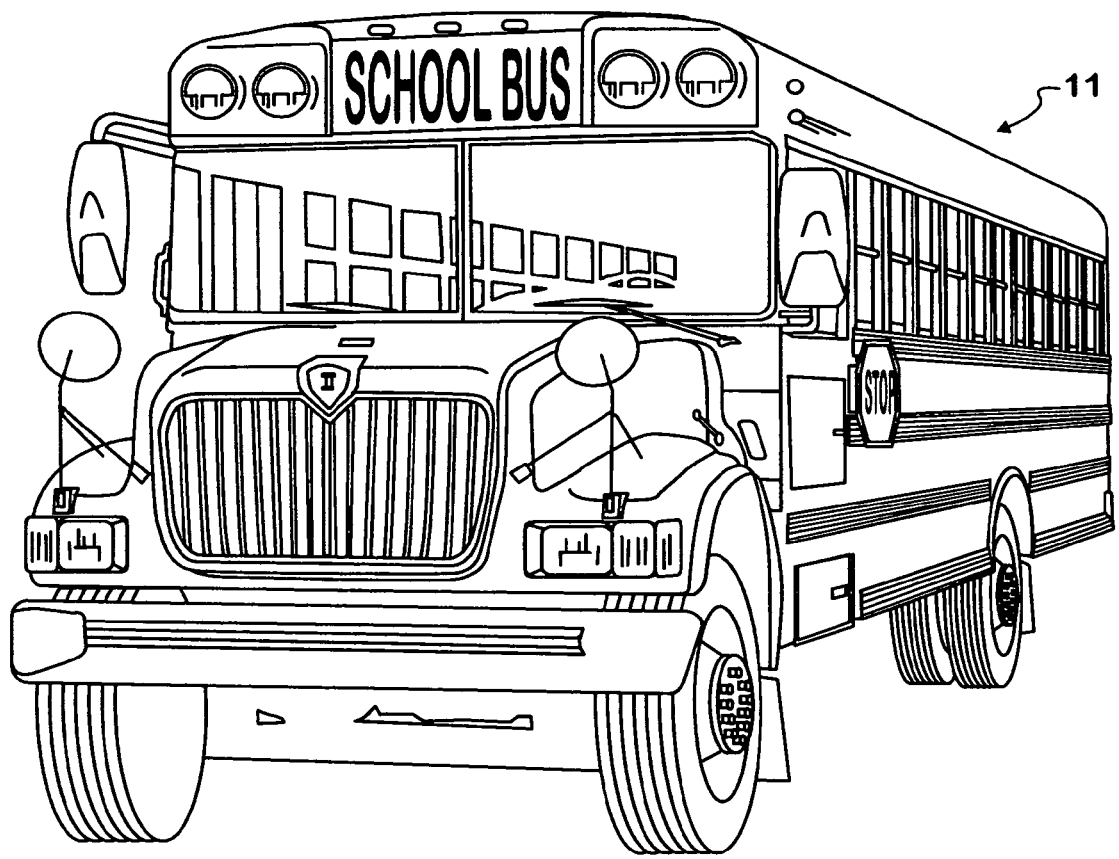
FIG. 1 is a perspective view of a school bus.

Referring to FIG. 1 a school bus 11 is illustrated. As is well known, school buses are conventionally equipped with rows of forward facing seats for passengers. These seats must meet impact federal regulations relating to unrestrained passengers. If equipped with three point seat belts the seat belts must also meet certain federal regulations.

Figure 2:
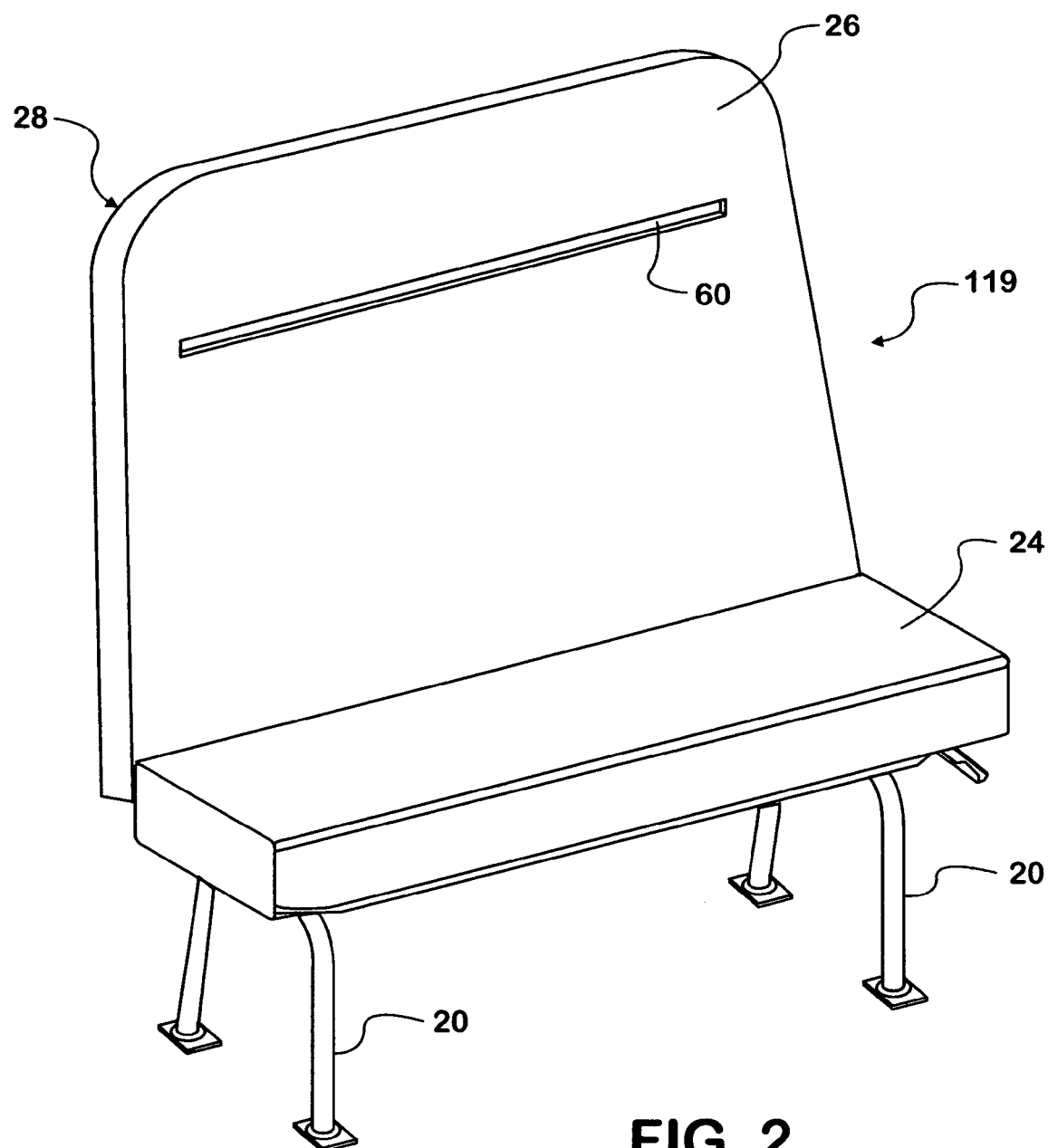
FIG. 2 is a perspective view of a school bus seat modified to handle a three-point seat belt.

FIG. 2 illustrates a school bus seat 119. Seat 119 is supported from a floor by risers 20 and includes a seat cushion 24 and a back cushion 26. Back cushion 26 is supported on a rear frame 28. A slot 60 through back cushion allows fitting of a torso belt where a three-point seat belt is incorporated with seat 119.

Figure 3:
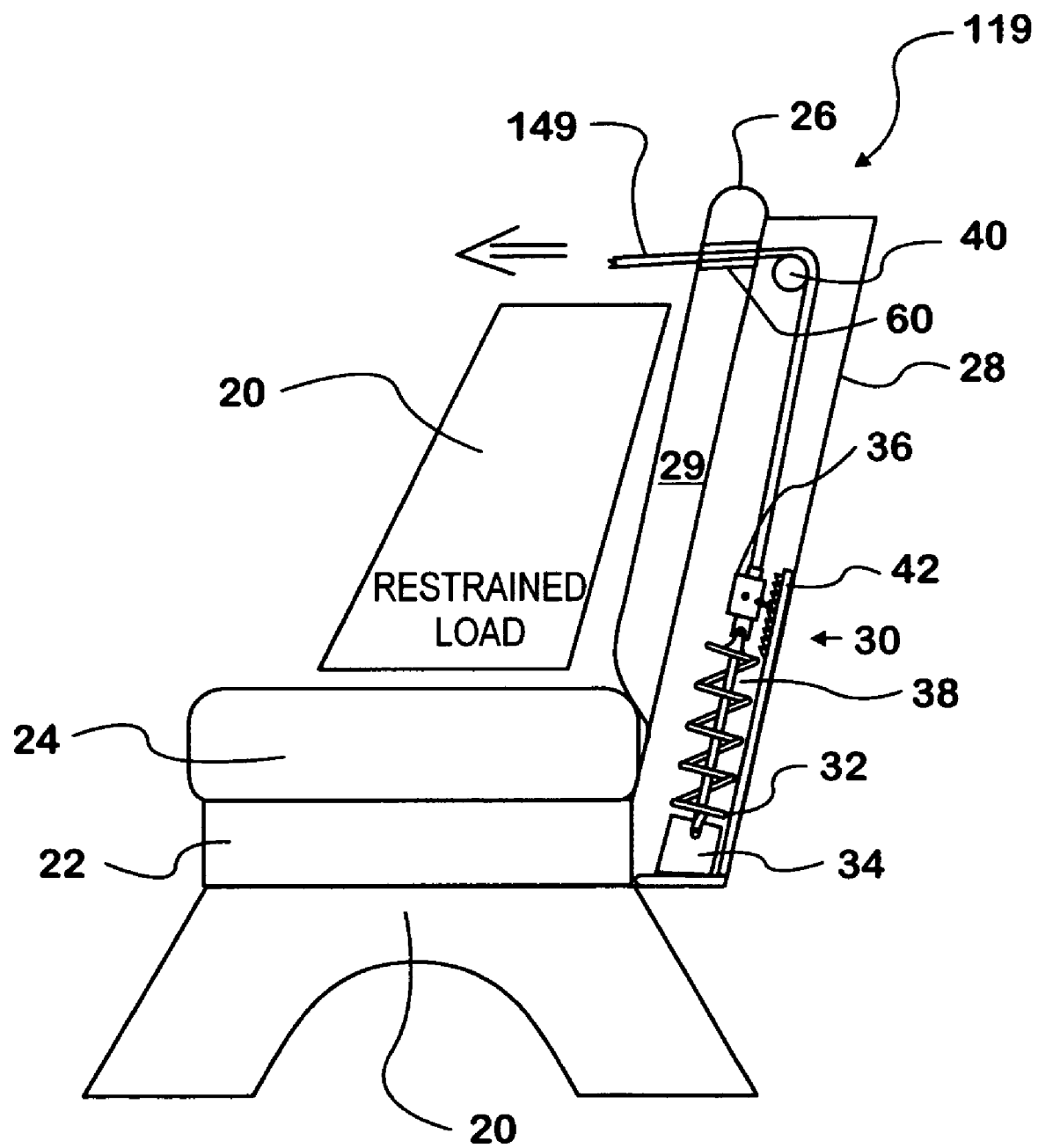
FIG. 3 is a cross sectional view of a school bus seat incorporating an energy absorbing torso belt linkage.

FIG. 3 illustrates seat 119 schematically to illustrate an energy absorbing linkage 30 located in the space 29 within seat back frame 28. Energy absorbing linkage provides for attachment of a passenger seat torso belt 149 to the seat back frame 28 (or to seat base frame 20). School bus seat 119, as is conventional, includes risers 20, which support a seat base frame 22. Depending from the rear edge of seat base frame 22 is a seat back frame 28. Seat base frame 22 supports a seat cushion 24 and seat back frame 28 supports a forward facing cushion 26. A restrained load is held in place by torso belt 149 and a lap belt (not shown). Seat back frame is conventionally designed to deform forward upon rear impact of a passenger up to 17 degrees from its initial rake.

Torso belt 149 passes into the interior of seat back frame 28 and over a capstan 40 mounted for rotation in the upper portion of the seat back frame (or a hanger loop) to a connection with a conventional seat belt retractor 36 (the details of which are not shown). Seat belt retractor 36, again as is conventional, locks when a belt 149 is withdrawn excessively quickly. Seat belt retractor 36 is not, however, directly mounted to the vehicle floor or to framing for the seat, as is conventional, but instead to energy absorbing linkage 30. Energy absorbing linkage 30 is in turn mounted to seat back frame 28 at the base of the frame and allows limited displacement of seat belt retractor 36, in the direction of withdrawal of the belt when the retractor has locked and when sufficient force is being applied to the belt.

Energy absorbing linkage 30 allows limited displacement of seat belt retractor 36 in the direction of withdrawal of the belt 149 when the retractor has locked and when sufficient force is applied to the belt. This can occur when a restrained load 20 (i.e. a load which is held in place on seat 119 by torso belt 149 and a cooperating lap belt) exhibits substantial acceleration relative to bus 11. Energy absorbing linkage 30 comprises two major components, a tension spring 32 and a displacement limiting linkage 38. Both tension spring 32 and displacement limiting linkage 38 are attached at their respective ends to seat belt retractor 36 and to an anchor 34. Anchor 34 is firmly mounted to seat back frame 28 or to seat base frame 22. Thus in the event of sudden deceleration of bus 11, a restrained load 20 accelerates forward from seat 119, resulting in retractile tension (indicated by the arrow) being applied to torso belt 149. The retractile tension results in seat belt retractor 36 locking and the force being transferred to tension spring 32. Tension spring 32 has a spring constant sufficiently high as to prevent most children from being able to comfortably displace it. Tension spring 32 will extend under sufficient loading though, transferring energy from unrestrained load 20 for storage in the spring. Displacement of the load 20 is limited by limiting the extent of displacement of tension spring 32. Limiting the extension of tension spring 32 is done by the mechanism of a displacement limiting linkage 38, such as a belt. To prevent snap back of the belt 149 a ratchet and pawl mechanism is provided which includes ratchet 42 mounted to seat back frame 28.

Figure 5:
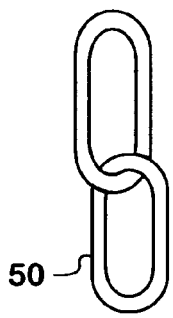
FIG. 5 is an illustration of an alternative displacement-limiting device for use with the energy absorbing torso belt mounting linkage.
Figure 4A:
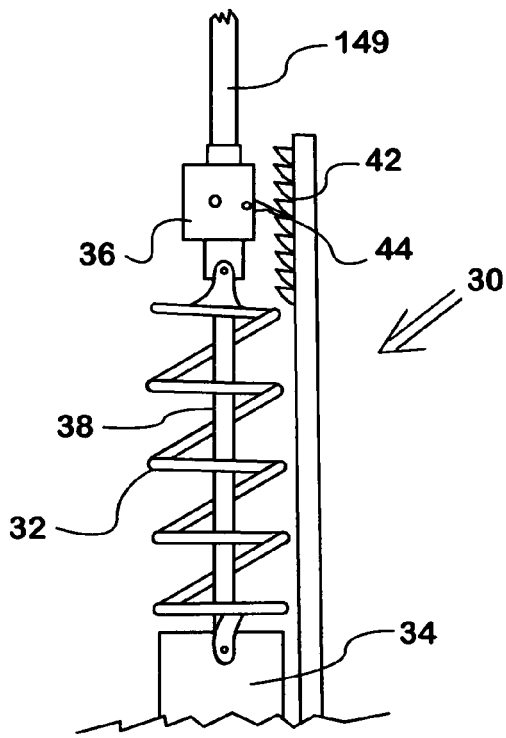
FIGS. 4A-B illustrate the energy absorbing torso belt mounting linkage in activated and static positions.
Figure 4B:
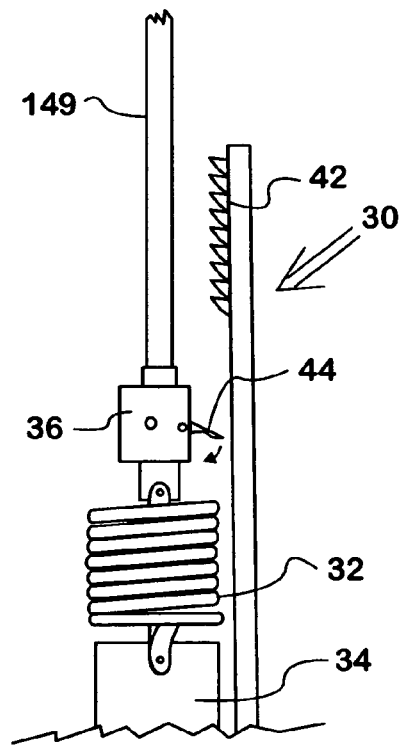

FIGS. 4A-B illustrate energy absorbing linkage 30 and its operation in greater detail. Energy absorbing linkage 30 is illustrated in an extended position, which results after activation of the mechanism, and in a static or retracted position, which reflects its state before a deceleration event. In the extended position the disposition of displacement limiting linkage 38 within the coils of tension spring 32 and the connection of both the linkage and the spring at their respective opposite ends to anchor 34 and to belt retractor 36 is readily seen. Absent a strong extractive force, tension spring 32 holds belt retractor 36 in its retracted position as shown in FIG. 4B. Snap back of the spring 32, once extended, is prevented by locking of a pawl 44 on one of the teeth of ratchet 42 as shown in FIG. 4A. Pawl 44 is spring loaded and pivots downwardly against the bias of the spring as indicated by the arrow in FIG. 4B allowing it to ride over the sawtooth pattern of ratchet 42. Displacement limiting linkage 38 may be fabricated from a nylon web like material such as used for belt 149, or it may be a chain link 50 such as illustrated in FIG. 5.

Referring to FIG. 6, operation of the invention is illustrated. School bus 11 includes a plurality of seats 119A-D installed on bus floor 103, two of which are equipped with 3-point seat belts including a torso belt 149 and a lap belt 159. It is not anticipated that vehicles would be sold where only a portion of the seats are equipped with seat belts. The illustration of a such a bus is intended only for purposes of illustration. The torso belt 149 plays out from an opening in the seat backs and attaches to lap belt 159 at a point of connection 155 at its end opposite to that anchored with seat back 131. Torso belt 149 cooperates with lap belt 159 to restrain passengers who have buckled into the seats such as passenger 202 in seat 119B. An unrestrained passenger 201 is shown coming forward from seat 119C from directly behind and into the back of seat 119B.

A decelerating force indicated by the letter "B" as having been applied to bus 11 resulting in passengers 202 and 201 having been thrown forward in the bus. Passenger 202 is initially slowed by action of tension spring 32 allowing time for passenger 201 to have collided with the back 131 of seat 11 9B. Under the impact of passenger 201, seat back 131 has tilted or deformed forward in the direction indicated from its initial position A to a final position D. After the deformation of seat back 131, the restraining limit of displacement limiting linkage 38 is reached resulting in the arrest of the forward motion of passenger 202 at a forward position on the seat 119B.

The invention provides for sequential occupant protection for both restrained and un-restrained passengers and works to meet the requirements both FMVSS 222 and 210 simultaneously. The invention also maintains minimum seat-back thickness which allows seats to maintain seat spacing requirements set forth by local and state government while seating the maximum feasible number of passengers.

While the invention is shown in only one of its forms, it is not thus limited but is susceptible to various changes and modifications without departing from the spirit and scope of the invention.

What is claimed is:

1. A vehicle passenger seat restraint system comprising:
a passenger seat and a passenger seat frame for mounting in a vehicle;
a three point seat belt including a lap belt and a torso belt for passing over one shoulder of a seat occupant to a point of connection with the lap belt;
an anchor point on the passenger seat frame;
a belt retractor connected to the torso belt at the end distal to the point of connection between the torso belt and the lap belt, the belt retractor being located relative to the passenger seat frame to allow withdrawal of the torso belt from the passenger seat for wearing and the belt rectractor being displacable relative to the passenger seat frame in the direction of withdrawal of the torso belt from the belt retractor when acceleration of the torso belt results in locking of the belt retractor;
a spring attached between the belt retractor and the anchor point to absorb energy upon displacement of the belt retractor in the direction of withdrawal of the torso belt; and
a displacement limiting linkage attached between the belt retractor and the anchor point.

2. The vehicle passenger seat restraint system as set forth in claim 1, further comprising:
the passenger seat frame including a base portion and a seat back portion, the seat back portion being designed to deform forward under impact from behind to a predetermined limit.

3. The vehicle passenger seat restraint system as set forth in claim 2, further comprising:
a snap back limiter for the spring.

4. The vehicle passenger seat restraint system as set forth in claim 3, the snap back limiter further comprising:
a ratchet installed on the passenger seat frame; and
a spring loaded pawl installed on the belt retractor to operate cooperatively with the ratchet.

5. The vehicle passenger seat restraint system as set forth in claim 1, the displacement limiting linkage being a chain linkage.

6. A seat harness assembly comprising:
a seat frame providing for forward deformation under rear impact;
a seat belt anchor attached to a fixed point on the seat frame;
a tension spring having first and second ends attached by the first end to the seat belt anchor;
a belt retractor attached to the second end of the tension spring and supported by the tension spring relative to the seat frame absent forward deformation of the seat frame;
a belt installed on the belt retractor to play out from the belt retractor at below a threshold extractive tension; and
the belt retractor being displacable relative to the seat frame responsive to extractive tension on the belt exceeding the threshold extractive tension.

7. The seat harness assembly of claim 6, further comprising:
a displacement limiting linkage connected between the seat belt anchor and the belt retractor parallel to the tension spring.

8. The seat harness assembly of claim 7, the seat frame comprising a base frame and a back frame, the back frame being constructed to deform forward in a predictable manner upon a rear impact to the back frame.

9. The seat harness assembly of claim 8, further comprising:
a snap back limiting mechanism preventing relaxation of the tension spring after extension.

10. The seat harness assembly of claim 9, the snap back limiting mechanism further comprising:
a biased pawl mounted on the retractor; and
a ratchet mounted to the seat frame along the travel of the retractor.

* * * * *